Feb. 10, 1970   H. EISSELE ET AL   3,494,015
SPIKE GUN

Filed Aug. 2, 1967   3 Sheets-Sheet 1

H. Eissele
B. Albeck
INVENTORS
By Watson, Cole, Grindle & Watson
Attys.

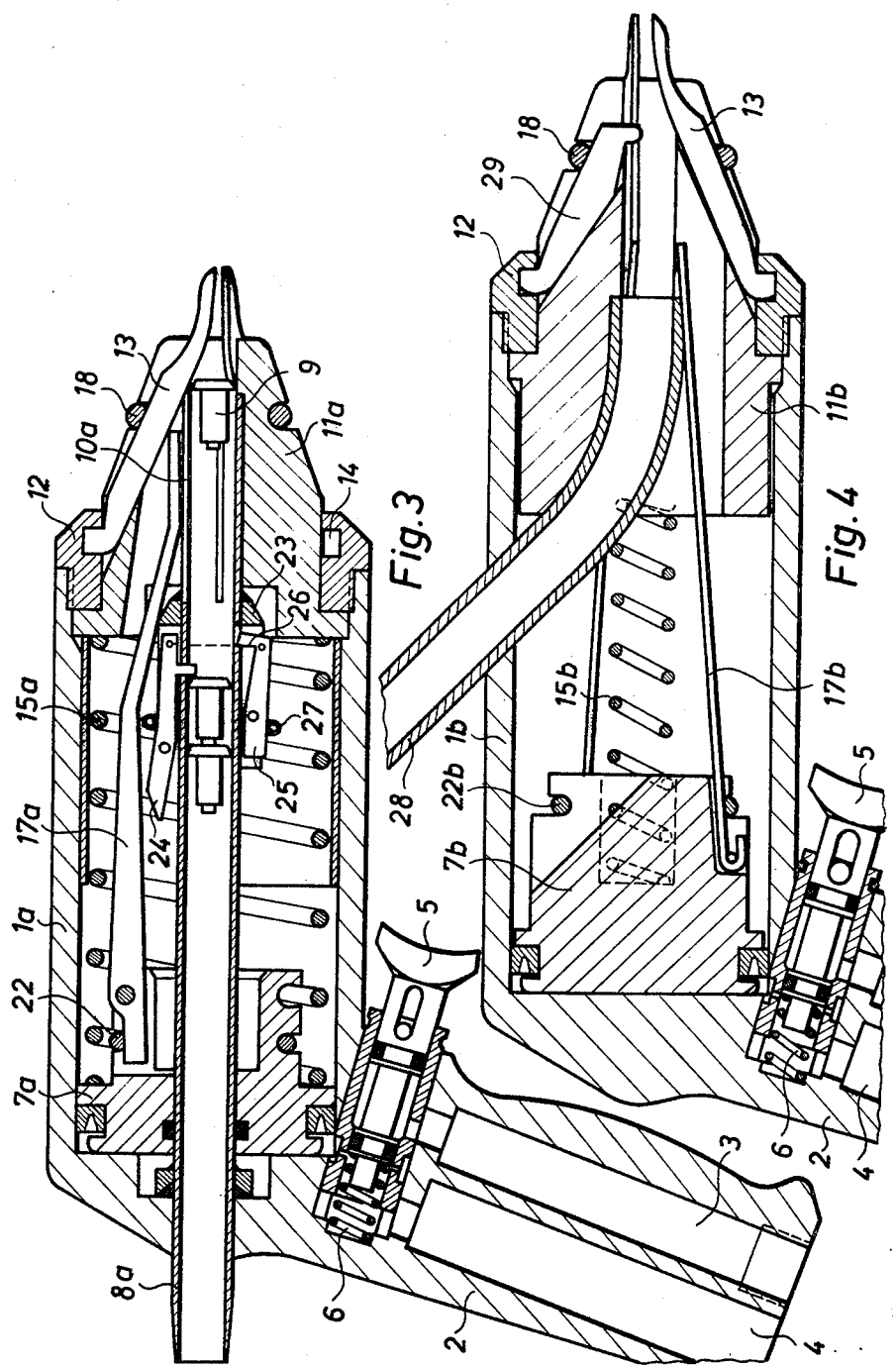

Feb. 10, 1970    H. EISSELE ET AL    3,494,015
SPIKE GUN
Filed Aug. 2, 1967    3 Sheets-Sheet 3
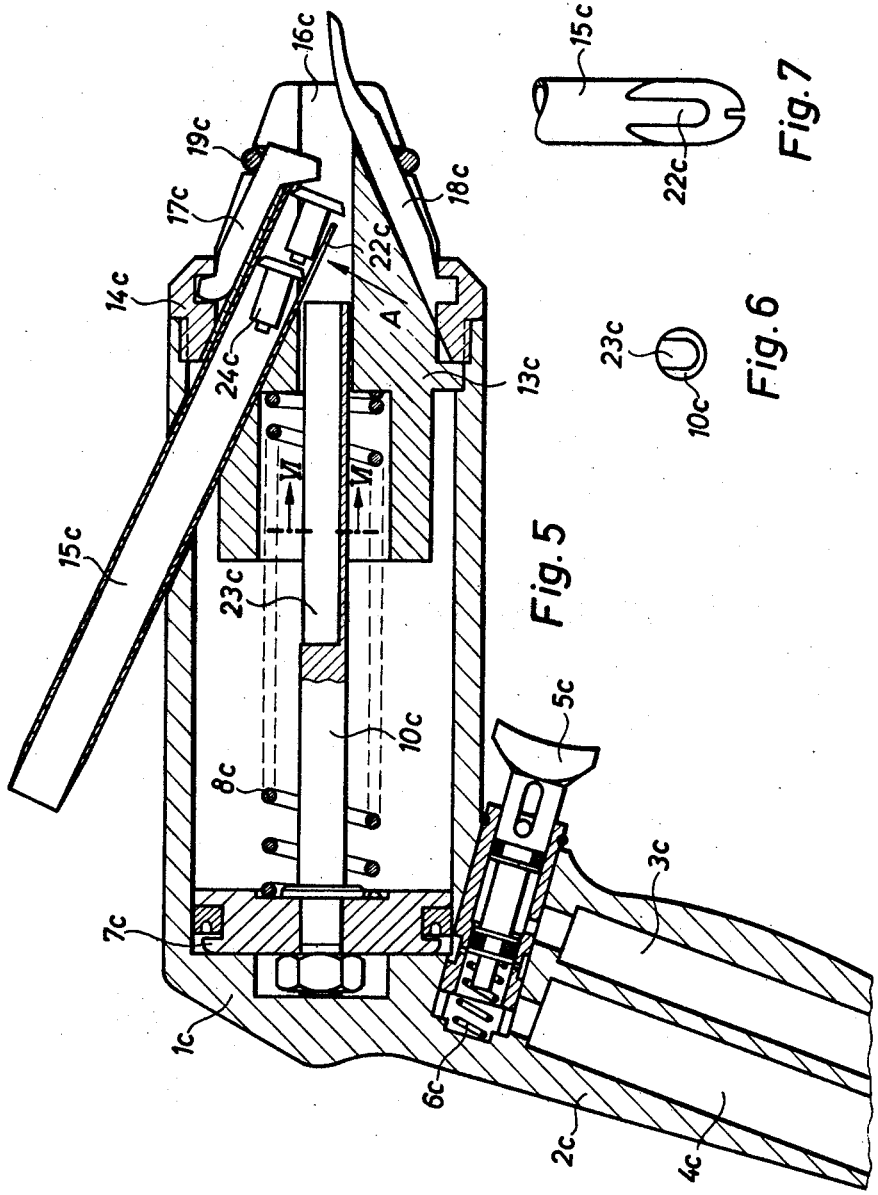
H. Eissele
B. Azbeck
INVENTORS
By Watson, Cole, Grindle & Watson
Attys.

United States Patent Office
3,494,015
Patented Feb. 10, 1970

3,494,015
SPIKE GUN
Heini Eissele, Stetten (Rems), and Bernhard Albeck, Neustadt, Wurttemberg, Germany, assignors to Firma Oku-Automatik Otto Kurz, Winterback, Kreis Waiblingen, Germany
Filed Aug. 2, 1967, Ser. No. 657,844
Claims priority, application Germany, Aug. 3, 1966, O 11,860; Dec. 17, 1966, O 9,119, O 12,159
Int. Cl. B23p 19/02
U.S. Cl. 29—212          21 Claims

ABSTRACT OF THE DISCLOSURE

A machine for inserting spikes into preformed holes in vehicle tires which is provided with spreading fingers which are first inserted into the bore in the tire and are then spread radially apart so as to expand this bore preferably by the spike itself while the latter is driven between these fingers and then into the bore by at least one piston-driven member which acts upon the flangelike head of the spike and also guides the spike so as to prevent it from tilting while being inserted.

---

The present invention relates to a machine, a so-called spike gun, for inserting spikes into the tires of vehicles. This machine generally comprises a housing, a piston which is movable within the housing by compressed air against the action of a return spring, and a head on this housing which supports a plurality of radially pivotable spreading fingers which are adapted to be inserted into a preformed bore in a tire and to be spread apart for expanding this bore preferably by the head of the spike when this spike is moved forwardly and then inserted into this bore by at least one drive member which is connected to and moved by the piston.

It is an object of the present invention to provide a machine of the above-mentioned type which insures that the spikes which are fed thereto automatically either from one side or from the rear will be guided toward and through this bore in a direction parallel to the axis of the piston.

According to the invention, this object is attained by providing the drive member in the form of at least one push rod which has a driving surface which is disposed eccentrically to the axis of the piston and is adapted to act upon the flange of the foremost spike, and by providing suitable means which are connected to and movable by the drive member and are adapted to hold the spike in a position substantially coaxial to the axis of the piston so that the spikes will be properly guided while passing through the machine so as to prevent them from wedging therein and also from tilting while being inserted into the bores in a tire. While a single drive member may be sufficient, it is often desirable to provide three drive members which act at equal peripheral distances from each other upon the head of the spike to be inserted. The machine operates independently of the direction in which the feed channel enters the housing and it is therefore possible to make it of various designs and constructions and also to manipulate it in different manners.

The numerous features of the present invention will become more clearly apparent from the following detailed description thereof which is to be read with reference to the accompanying drawings, in which FIGURES 1 to 5 show diagrammatically longitudinal sections of five different embodiments of the spike gun according to the invention;

FIGURE 6 shows a cross section which is taken along the line VI—VI of a part as shown in FIGURE 5; while FIGURE 7 shows a view of another part as seen in the direction of the arrow A in FIGURE 5.

Figure 1:
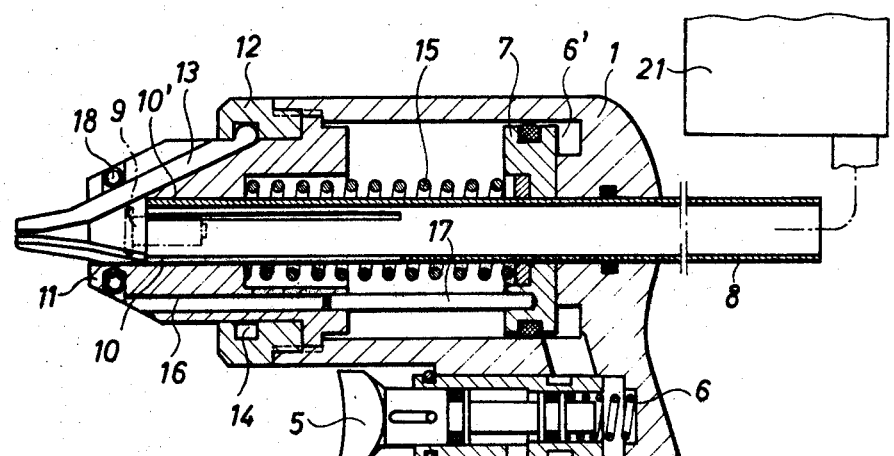

Referring first particularly to FIGURE 1, the spike gun according to the invention comprises a housing 1 with a grip 2 thereon which is provided with a compressed-air supply channel 3 and an air outlet channel 4. These two channels may be manually controlled by a slide valve, the valve member 5 of which extends at an angle to the channels 3 and 4 and is acted upon by a spring 6 which tends to maintain the valve member in a position in which it interrupts a connection between the supply channel 3 and an annular chamber 6′ in the housing 1 while this chamber 6′ communicates with the outlet channel 4.

Housing 1 contains a piston 7 which is axially slidable therein and mounted on a tubular piston rod 8 which extends through the housing and projects from the rear end thereof. The outer end of piston rod 8 is adapted to be connected by a flexible tube to a magazine 21 containing a supply of spikes. The front end of piston rod 8 is provided with slots 10 extending in the axial direction or in an inclined direction and thereby forms a collet with gripping fingers 10′ for holding the shank of a spike 9. The slotted part 10 of piston rod 8 is guided within a separate head 11 which is inserted into housing 1 and secured thereto by a screw ring 12. Head 11 contains several, preferably three, spreading fingers 13 which are radially pivotable therein within radial slots and the rear ends of which are pivotably mounted at equal peripheral distances from each other within an annular groove 14 in screw ring 12. An annular spring 18 tends to maintain the spreading fingers 13 in their inwardly pivoted or closed position. A coil spring 15 around the piston rod 8 between the head 11 and piston 7 tends to maintain this piston in the rear position as illustrated in FIGURE 1.

The slots 10 are peripherally offset relative to the spreading fingers 13 so that the latter cannot engage therein but rest on the front edge of piston rod 8 or the gripping fingers 10′. In order to prevent the piston 7 from turning, it is provided with a pin 17 which is slidable within a bore 16 in the head 11.

The tubular piston rod 8 which is connected to the magazine 21 is adapted to hold a series of spikes behind each other. The flangelike head of the first spike 9, as indicated in FIGURE 1, then engages upon the spreading fingers 13. If piston rod 8 is moved forwardly either by hand or by an actuation of valve member 5 causing the compressed air to act upon the piston 7, the gripping fingers 10′ on the front end of piston rod 8 which engage upon the spreading fingers 13 are pivoted radially inwardly under the action of the annular spring 18 so as to grip the shank of spike 9. During the further movement of piston 7 and piston rod 8, one or the other presses against and spreads apart the spreading fingers 13, which were previously inserted into a preformed bore in a tire, and which then expand this bore so that the piston rod 8 pressing against the head of spike 9 will then push the latter into and through this bore into the tire. During the following return stroke of piston 7 together with piston rod 8 the gripping fingers will open under their own spring action and thereby release the spike so that the machine may then be retracted from the tire.

Since the inner diameter of the front part of piston rod is reduced by the pressure of its end against the spreading fingers 13 during the forward stroke of the piston and piston rod, the spike following the one which is then being inserted will be prevented from sliding along the piston rod and be held therein until the first spike has been inserted into the tire and the piston rod has then been retracted so far that its front end is no longer compressed by the spreading fingers 13. The following spike will then move under its own weight and the weight of the spikes behind it to the position as indicated in FIGURE 1, in which its head abuts against the spreading fingers 13. The spikes, may however, also be fed by means of compressed air. During the operation of the spike gun, piston 7 will be shifted forwardly from its neutral position by a suitable pressure medium, preferably compressed air and it will be returned to its neutral position by the action of spring 15.

Figure 2:
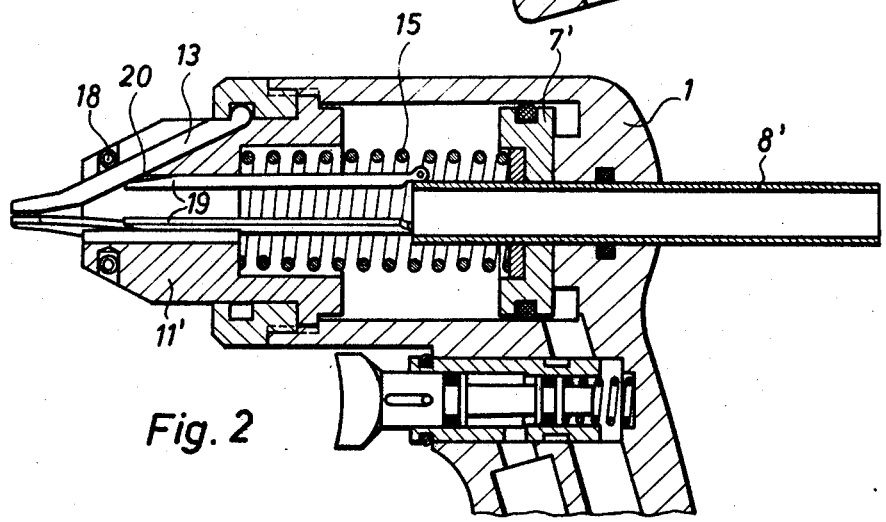

The spike gun as illustrated in FIGURE 2 differs from that according to FIGURE 1 essentially only by a different construction of the piston rod 8' which, in turn, also requires the head 11' to be slightly modified. The other parts of the gun correspond to those as shown in FIGURE 1, except that due to the omission of the guide pin 17 the piston 7' also differs slightly from that according to FIGURE 1.

In place of the gripping fingers 10' being formed by providing the front part of piston rod 8 with the slots 10 as shown in FIGURE 1, the spike gun according to FIGURE 2 is provided with three separate gripping fingers 19 which are pivotably mounted on the front end of piston rod 8' and are guided in grooves 20 in the head 11'. The manner of operation of the spike gun according to FIGURE 2 is the same as described with reference to FIGURE 1.

Since the spikes are supplied through the piston rod 8 or 8' according to FIGURE 2, the spike gun itself may be made of a relatively short length in the axial direction. Since the spikes will be gripped by the gripping fingers 10' or 19 directly behind their flangelike head, it is also possible to employ short spikes and to guide and hold them securely and in an exactly central position. There is no danger that the heads of the spikes will be damaged since the pressure which is exerted by the annular spring 18 will be taken up by the gripping fingers 10' or 19 and the heads of the spikes can therefore slide quite easily between these fingers even if they spread them apart during their movement.

FIGURE 3 illustrates a spike gun according to another modification of the invention. Its housing 1a is again provided with a grip 2 which contains a compressed-air supply channel 3 and an air outlet channel 4 which may be manually controlled by a slide valve, the valve member 5 of which extends at an angle to the channels 3 and 4. A spring 6 tends to maintain the valve member 5 in a position in which the connection between the supply channel 3 and the inside of the housing 1a is interrupted while this inside communicates with the outlet channel 4.

Along the inner wall of housing 1a and along the outer surface of a guide tube 8a a piston 7a is slidable in the axial direction. Guide tube 8a is adapted to be connected by a flexible tube to a spike magazine, not shown. On its front end guide tube 8a is provided with three axially extending slots 10a which are equally spaced peripherally from each other. This front end of guide tube 8a is inserted into a head 11a which is secured to the housing 1a by a screw ring 12.

Head 11a contains several, preferably three radial slots in which spreading fingers 13 are radially pivotable, the rear ends of which are pivotably mounted in an annular groove 14 in a screw ring 12, while an annular spring 18 which is inserted into an annular groove in the head 11a tends to maintain the spreading fingers 13 in their inwardly pivoted or closed position. A coil spring 15a between head 11a and piston 7a tends to maintain this piston in its rear position, as shown in FIGURE 3.

Slots 10a in guide tube 8a are located in such positions that the spreading fingers 13 will pass through these slots into guide tube 8a. Each of these slots 10a is also adapted to receive the front end of one arm of a two-arm push lever 17a which is pivotably mounted within a radial slot in piston 7a. The rear arms of these levers 17a are acted upon by an annular spring 22 which is mounted within an annular groove in piston 7a. The front ends of push levers 17a are adapted to engage upon the head of a spike 9 which is located within the front end of guide tube 8a. In the position as indicated in FIGURE 3, the front end of lever 17a engage upon the inner side of the spreading levers 13.

Adjacent to the head 11, guide tube 8a is further provided with a spike lock which comprises a bushing 23 which is secured on guide tube 8a and the conical front end of which facing the head 11a is adapted to guide the levers 17a. Bushing 23 is provided with a pair of axially extending slots in each of which a two-armed locking lever 24 or 25 is pivotably mounted. These levers are connected to each other by a connecting member 26 and each of them is provided near its front end with an inwardly projecting detent. These detents are offset in the axial direction relative to each other and the detent on one of these levers 24 and 25 is adapted to engage into the guide tube 8a, while the detent on the other lever is located outside of the guide tube or vice versa.

Guide tube 8a which is connected to the magazine contains a row of spikes. The flange of the foremost spike 9 near the front end of head 11a engages upon the spreading fingers 13. If by the actuation of valve member 5 the piston 7a is driven forwardly by compressed air against the action of spring 15a, it also takes along the push levers 17a which by engaging with the spreading fingers 13 are pivoted radially inwardly and engage into the slots 10a and then against the head of the foremost spike 9 so as to push the same through a bore in a tire, not shown, after the spreading fingers 13 have been inserted into this bore and having expanded the same by the movement of the spike between them.

When the inner wall of the hollow piston 7a engages upon the inclined rear end of lever 24 and thereby pivots this lever, its detent is withdrawn from guide tube 8a so that the spike which was held by this detent is released and moved forwardly to be arrested again by the detent on lever 25 which due to the connecting member 26 is pivoted simultaneously with lever 24. When the piston 7a during its return movement disengages from lever 24, an annular spring 27 which acts upon the front arm of lever 24 and the rear arm of lever 25 returns these two levers to the position as shown in FIGURE 3 with the result that the spike which was previously held by the detent on lever 25 is released and will drop in the direction toward the spreading fingers 13 until it is stopped by these fingers. The spike gun is for this purpose held in such a position that the spikes will be moved by their own weight forward within guide tube 8a.

FIGURE 4 illustrates a spike gun according to a fourth embodiment of the invention, in which those parts which correspond to the parts of the embodiments as previously described are indicated by the same reference numerals, while those parts which are similar but of a different shape or design are indicated by the same numerals to which the letter b is added. The essential difference from the embodiments according to FIGURES 1 to 3 consists in the fact that the tube 28 for feeding the spikes from the magazine to the spike gun enters the housing 1b from a lateral side. Thus, there is no guide tube 8, 8', or 8a as in the first three embodiments of the invention, but the piston 7b is a free piston on which three resilient push rods 17b are pivotably mounted at equal peripheral distances from each other. Piston 7b is provided with an annular groove containing an annular spring 22b which tends to pivot the push rods 17b radially inwardly so that when the piston 7b is in its neutral rear position, the free ends of these rods engage upon the tapered end of feed tube 28, which end points in the direction in which the spikes are to be inserted into a tire.

The base of each notch in piston 7b for receiving one of the push rods 17b is located very close to this rod and serves as an abutment for preventing it from being bent.

In place of a spike lock as shown in FIGURE 3, the spike gun according to FIGURE 4 is provided with three locking levers 29 the rear ends of which are mounted at equal peripheral distances from each other within the annular groove in ring 12 and which are pivotable within radial slots in the front end of head 11b between the slots in which the spreading fingers 13 are pivotable.

When the free piston 7b is moved in the direction toward the head 11b, the push rods 17b engage upon the rear side of the head of the foremost spike and press the same into the tire in the same manner as it is done by the push levers 17a in the spike gun according to FIGURE 3 after the spike head has pivoted the spreading fingers 13 outwardly and has thereby expanded the bore in the tire. The locking levers 29 hold back the further spikes which are supplied through the feed tube 28. Since this tube 28 extends at an angle to the axis of the head 11b, it is also possible to insert spikes in a horizontal direction into a tire.

Instead of providing the spike gun according to FIGURE 4 with an inclined feed tube 28, it is also possible to provide it with a straight guide tube similar to the tube 8a in FIGURE 3. The inner end of this guide tube should then be tapered like the inner end of feed tube 28 and the piston should be moved along the guide tube in the same manner as the piston 7a in FIGURE 3. In all other respects the construction of this spike gun would remain the same.

The spike gun according to FIGURE 5 comprises a housing 1c with a grip 2c thereon which contains a compressed-air supply channel 3c and an air outlet channel 4c. The connection between these channels and the inside of the housing 1c is again controlled by a slide valve, the valve member 5c of which may be operated at will by hand, while a spring 6c tends to maintain this valve member 5c in its closed position.

Housing 1c contains a piston 7c which is slidable in its axial direction against the action of a coil spring 8c. Piston 7c is secured to a piston rod 10c which is nonrotatable about its axis and designed as a push rod. Its free end is axially slidable in and guided by a head 13c which is secured by a screw ring 14c in the housing 1c. The spikes 24c are fed into the head 13c through a feed channel 15c which extends at an acute angle to the axis of piston rod 10c and to a channel 16c in the head 13c and terminates into this channel 16c near the free end of piston rod 10c when the latter is in its neutral rear position.

The front part of the head 13c is provided with a radial slot in which a locking lever 17c is pivotable, the rear end of which is mounted in an annular groove in the screw ring 14c, while its hook-shaped front end guards the mouth of the feed channel 15c leading into the channel 16c in the head 13c. Aside from the radial slot for the locking lever 17c, the head 13c is further provided with additional radial slots which are equally spaced peripherally from each other and contain spreading fingers 18c the rear ends of which are likewise pivotably mounted in the annular groove in ring 14c. A spring ring 19c in an annular groove in the outside head 13c tends to press the free ends of the locking lever 17c and of the spreading fingers 18c radially toward the inside.

Feed channel 15c is formed by a straight tube the front end of which engages into the channel 16c and is provided with a pair of slots, as indicated in FIGURE 7 which leaves between them a tongue 22c at the side facing the piston rod 10c. This tongue 22c projects beyond the center of channel 16c since the end of piston rod 10c adjacent to the feed channel 15c is provided with a recess 23c which has an inner width equal to the shank of a spike and a length equal to the distance of travel of piston rod 10c. Tongue 22c fits loosely into the recess 23c of piston rod 10c the front part of which due to the recess 23c has a substantially U-shaped cross section, as shown in FIGURE 6.

The foremost of the spikes 24 within the feed channel 15c projects into the channel 16c in the head 13c and is arrested by engaging with its head against the locking lever 17c, while the side of its shank rests on the tongue 22c. When valve 5c is then actuated so that the piston 7c will be driven forwardly by compressed air, the front end of piston rod 10c will engage upon the flangelike head of the foremost spike 24c and push it forwardly. The locking lever 17c will thereby be pivoted outwardly in a radial direction, while the shank of this spike 24 will rest within the corresponding recess 23c in piston rod 10c. By the further forward movement of piston rod 10c, spike 24c will then engage with and spread apart the spreading fingers which previously have been inserted into a bore in a tire so that this bore will be expanded and spike 24c will be pushed out of the nozzle of head 13c and through this bore into the tire. During the strokes of the piston rod 10c along the area underneath the outlet opening of feed channel 15c, this rod will block the feeding of a further spike from this channel into the channel 16c in head 13c until near the end of the return stroke of piston rod 10c, the next spike can slide forwardly and abut against the locking lever 17c and will thus be in the proper position for the next operation of the machine so as to be driven by piston rod 10c along channel 16c and against the spreading fingers 18c and then into the bore in the tire.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. Device for insertion of spikes into vehicle tires and similar member, comprising a housing, a piston in the housing shiftable counter to the action of a spring, an inserting head in the housing and carrying radially swivelable spreaders, a rammer body engaging a spike in effective connection, the rammer body holding the spike essentially coaxially in relation to the axis of the piston, the rammer body being arranged laterally relative to the axis of the piston and adapted as well for engagement of a flange part of the spike and has been insured against twisting on a part of its sliding path, and a holding device for the spike so that a series of closely consecutive spikes are provided which lie in an axial prolongation of the piston being in its rest position.

2. Device according to claim 1, in which the rammer body is to be moved in a radial direction at least as to its ends adjoining an insert head.

3. Device according to claim 1, in which the rammer body is articulated at least indirectly to the piston.

4. Device according to claim 1, in which the rammer body is guided in a radial notch in the piston.

5. Device according to claim 1, in which said holding device comprises a tubular spike feed member extending at least partly through said housing and having a front end substantially coaxial to said piston and terminating into said channel, said drive member forming a one-armed lever, and spring means on said piston acting upon said lever and tending to pivot the same inwardly so that its front part engages upon and is guided by the front end of said feed member.

6. Device according to claim 1, in which said holding device comprises a tubular spike feed member extending at least partly through said housing and having a front end substantially coaxial to said piston and terminating into said channel, said drive member forming a one-armed lever, and spring means on said piston acting upon said lever and tending to pivot the same inwardly so that its front part engages upon and is guided by the front end of said feed member, said drive member consisting of a spring rod.

7. Device according to claim 1, wherein said feeding means comprise a tubular spike feed member extending centrally through said housing and being rigidly secured thereto, and having a front end terminating into said channel, said piston being slidable along and guided by said feed member.

8. Device according to claim 1, wherein said feeding means comprise a tubular spike feed member extending centrally through said housing and being rigidly secured thereto, and having a front end terminating into said channel, the front part of said feed member having an axially extending slot, the front part of said front arm of said lever being adapted to pivot into said slot and against the shank of said spike when engaging during the first part of the forward stroke of said piston against one of said fingers.

9. Device according to claim 1, in which said tubular feed member has at least one aperture, said holding means comprising at least one spike locking member on the outer side of said feed member and having a projection engaging through said aperture into said feed member when said piston is in its rear end position and adapted to be withdrawn from said aperture near the end of the forward stroke of said piston.

10. Device according to claim 1, in which said piston has at least one radially extending slot for guiding said lever, means for pivotably mounting the rear end of said lever within said slot, said slot having a bottom serving as an abutment for preventing said lever from bending.

11. Device according to claim 1, in which said tubular feed member extends at an angle into said housing through a lateral wall thereof and is curved within said housing so that its open front end terminates into said channel in a direction substantially coaxial to said piston, said front end forming an abutment for guiding said drive member, said piston being guided only by the inner wall of said housing and having a recess in the side facing said feed member adapted to receive a part of said feed member during the forward stroke of said piston.

12. Device according to claim 1, in which said tubular feed member extends from the rear end of said housing in any position of its movement by said piston, the rear end of said feed member being adapted to be connected to a spike magazine spaced from said machine.

13. Device according to claim 1, in which a piston rod is provided, guided in the housing, the rammer body being attached to said rod, whereby the piston rod is in the form of a pipe and projects in each of its shifting positions from the housing, and in which a magazine is provided for the spikes to be connected up at that of its ends facing away from the rammer body.

14. Device according to claim 1, in which a piston rod is provided, guided in the housing, the rammer body being attached to said rod, whereby the piston rod is in the form of a pipe and projects in each of its shifting positions from the housing, and in which a magazine is provided for the spikes to be connected up at that of its ends facing away from the rammer body, and the piston rod is in one piece with the rammer body, and formed by essentially axis parallel notches.

15. Device according to claim 1, in which spreaders are provided to be spread at least in the course of the piston stroke by means of the rammer body, secured in their revolving position.

16. Device according to claim 1, in which spreaders are provided to be spread at least in the course of the piston stroke by means of the rammer body, secured in their revolving position, and in which a peg is provided shiftable in a bore in the inserting head, and arranged on the piston.

17. Device according to claim 1, in which a piston rod is provided guided at least indirectly in the inserting head and with a feed channel for the spikes arranged at an angle in relation to the axis of the piston rod, and which empties into an inserting channel swept by the piston rod, the piston rod at its ends adjoining the feed channel and has a recess forming the rammer body for the reception of a shaft of a spike.

18. Device according to claim 1, in which a piston rod is provided guided at least indirectly in the inserting head and with a feed channel for the spikes arranged at an angle in relation to the axis of the piston rod, and which empties into an inserting channel swept by the piston rod, the piston rod at its ends adjoining the feed channel and has a recess forming the rammer body for the reception of a shaft of a spike, on the side of the feed channel adjoining the piston rod, a projection projects into the inserting channel and in the case of shifting of the piston rod into its recess, said projection serving for the guidance of the spikes.

19. Device according to claim 1, in which a piston rod is provided guided at least indirectly in the inserting head and with a feed channel for the spikes arranged at an angle in relation to the axis of the piston rod, and which empties into an inserting channel swept by the piston rod, the piston rod at its ends adjoining the feed channel and has a recess forming the rammer body for the reception of a shaft of a spike, and in which is provided a pipe forming the feed channel at its ends located in the inserting head and having two notches which allow the projection to remain between them, and the projection engaging with the recess of the piston rod and the piston rod engages with play with the notches at the feed channel.

20. Device according to claim 1, in which a piston rod is provided guided at least indirectly in the inserting head and with a feed channel for the spikes arranged at an angle in relation to the axis of the piston rod, and which empties into an inserting channel swept by the piston rod, the piston rod at its ends adjoining the feed channel and has a recess forming the rammer body for the reception of a shaft of a spike, and in which a blocking element is provided so that within the area of the mounting of the feed channel into the inserting head, a blocking element is arranged which limits the progress of the spike and which controls the emptying of the feed channel into the inserting channel under the action of a spring.

21. Device according to claim 1, in which a piston rod is provided guided at least indirectly in the inserting head and with a feed channel for the spikes arranged at an angle in relation to the axis of the piston rod, and which empties into an inserting channel swept by the piston rod, the piston rod at its ends adjoining the feed channel and has a recess forming the rammer body for the reception of a shaft of a spike, and in which a recess is provided in the piston rod corresponding to the diameter of the body of the spike and serves during insertion for its reception, whereby the piston rod in the area of the recess and in its cross-section has been developed U-shaped.

References Cited

UNITED STATES PATENTS

| | | |
|---|---|---|
| 3,258,835 | 7/1966 | Boggild et al. |
| 3,348,291 | 10/1967 | Niedzweicki. |
| 3,387,352 | 6/1968 | Walter. |
| 3,398,446 | 8/1968 | Karlsson. |

FOREIGN PATENTS

| | | |
|---|---|---|
| 206,592 | 8/1966 | Sweden. |

THOMAS H. EAGER, Primary Examiner

U.S. Cl. X.R.

29—235